(12) United States Patent
Ulrich et al.

(10) Patent No.: US 9,404,401 B2
(45) Date of Patent: Aug. 2, 2016

(54) METHOD FOR OPERATING A FORCED-INDUCTION INTERNAL COMBUSTION ENGINE WITH VARIABLE COMPRESSION

(71) Applicants: Alexander Carsten Ulrich, Tamm (DE); Stefan Gottlieb, Hemmingen (DE)

(72) Inventors: Alexander Carsten Ulrich, Tamm (DE); Stefan Gottlieb, Hemmingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 181 days.

(21) Appl. No.: 14/447,456

(22) Filed: Jul. 30, 2014

(65) Prior Publication Data

US 2015/0039205 A1     Feb. 5, 2015

(30) Foreign Application Priority Data

Jul. 31, 2013   (DE) .......................... 10 2013 214 964

(51) Int. Cl.
| | |
|---|---|
| *F01L 13/08* | (2006.01) |
| *F02D 13/02* | (2006.01) |
| *F02D 15/00* | (2006.01) |
| *F01L 13/00* | (2006.01) |
| *F01L 1/344* | (2006.01) |
| *F02D 35/02* | (2006.01) |
| *F02D 41/00* | (2006.01) |
| *F02D 41/14* | (2006.01) |

(52) U.S. Cl.
CPC ............. *F01L 13/08* (2013.01); *F02D 13/0269* (2013.01); *F02D 15/00* (2013.01); *F01L 1/344* (2013.01); *F01L 13/0015* (2013.01); *F01L 13/0036* (2013.01); *F01L 2013/115* (2013.01); *F02D 35/027* (2013.01); *F02D 41/0007* (2013.01); *F02D 2041/001* (2013.01); *F02D 2041/1433* (2013.01); *Y02T 10/142* (2013.01)

(58) Field of Classification Search
CPC ... F01L 13/08; F01L 13/0036; F01L 13/0015; F01L 13/0269; F02D 13/02; F02D 13/08; F02D 15/00; F02D 41/0007; F02D 41/001; F02D 41/1433; F02D 35/027; Y02T 10/142
See application file for complete search history.

(56) References Cited

U.S. PATENT DOCUMENTS 6,282,898 B1 * 9/2001 Solaroli .............. F02D 41/0007
                                                                      123/556
8,646,421 B2 * 2/2014 Durrett .................... F02B 47/10
                                                                      123/568.14

FOREIGN PATENT DOCUMENTS

DE         102 58 872         7/2004
WO    WO 2005010332 A1 *   2/2005   .......... F02D 41/0032

* cited by examiner

*Primary Examiner* — Hieu T Vo
(74) *Attorney, Agent, or Firm* — Norton Rose Fulbright US LLP

(57) ABSTRACT

In a method for operating a forced-induction internal combustion engine of a motor vehicle with variable compression, provision is made that the variable compression is pilot-controlled in such a way that a selected compression is established as a function of combustion efficiency and of the mechanical stress on components of the internal combustion engine, such that elevated compression is provided in the naturally aspirated range and/or decreased compression is provided in the forced-induction range. The variable compression is generated by phase shifting of a camshaft of the internal combustion engine, or by cam switching by way of a variable valve train.

11 Claims, 1 Drawing Sheet

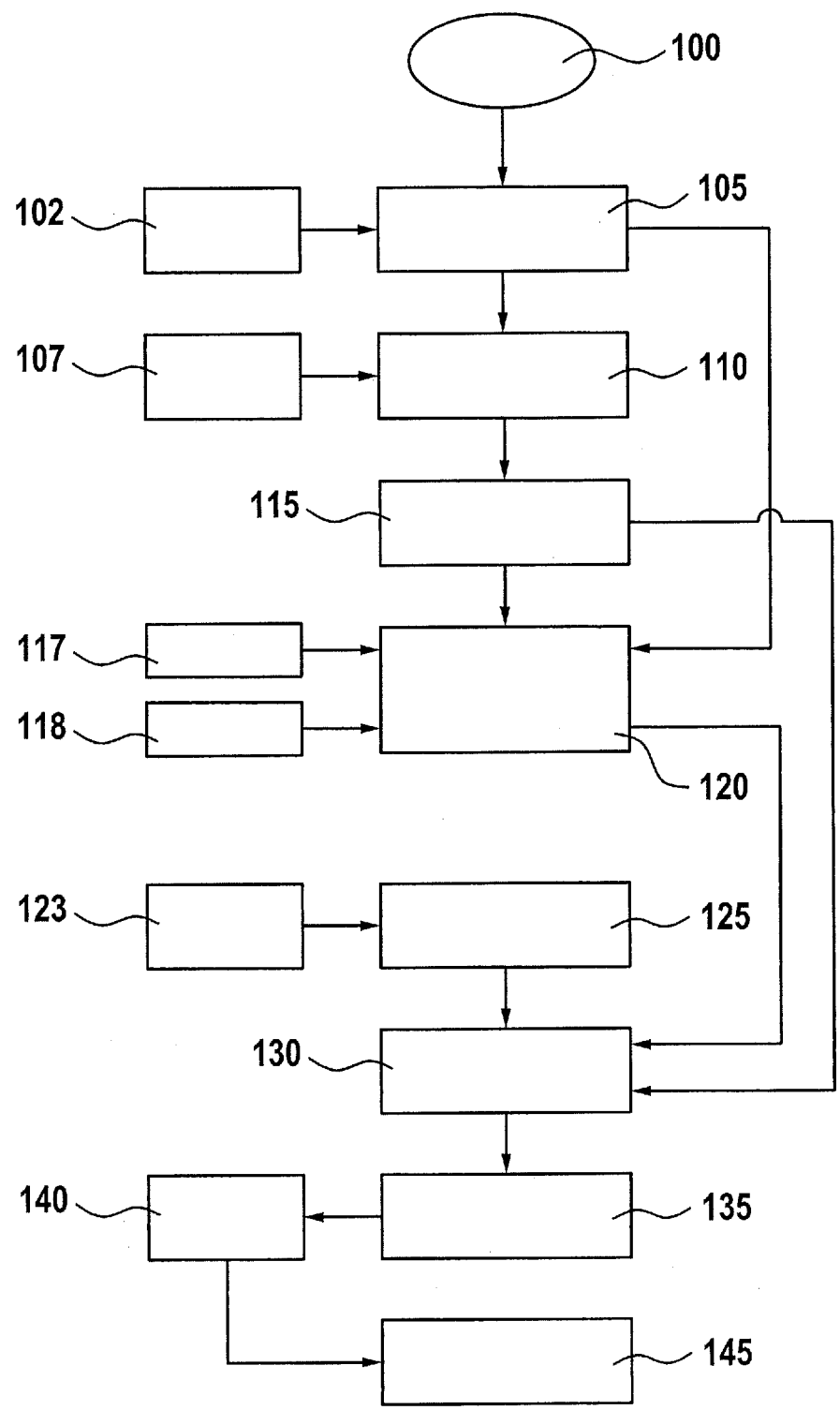

METHOD FOR OPERATING A FORCED-INDUCTION INTERNAL COMBUSTION ENGINE WITH VARIABLE COMPRESSION

BACKGROUND OF THE INVENTION

1. Field of the Invention

The present invention relates to a method and a computer program for operating a forced-induction internal combustion engine.

2. Description of Related Art

The compression of a fuel/air mixture in a combustion chamber (cylinder) of an internal combustion engine relevant here can be modified in essence by varying the point in time at which intake valves disposed on the cylinders close. The point in time at which an intake valve closes, indicated with reference to the so-called "bottom dead center point" in the context of combustion, is modified, for example in the context of a variable valve train, by way of a phase-shiftable intake camshaft.

A method for operating an internal combustion engine with a variable compression ratio is evident from published German patent application document DE 102 58 872 A1. With the method therein, starting of the internal combustion engine is accomplished at a compression ratio that is decreased with respect to compression ratios during normal operation of the internal combustion engine. FIG. 1 therein describes an apparatus for generating a variable compression ratio, but in this case the technical details regarding implementation of a variable compression ratio are not of importance.

It is furthermore known to optimize the compression ratio in two different directions when designing internal combustion engines. The "compression ratio" refers to the volume of the entire cylinder space prior to compression, in relation to the remaining volume once compression has occurred. In naturally aspirated engines the compression ratio is designed for high combustion efficiency, whereas with forced-induction engines the principal concern is the least possible mechanical stress on those components of the internal combustion engine which are involved in combustion and in forced induction, and thus optimal protection from possible mechanical overload.

BRIEF SUMMARY OF THE INVENTION

In the method according to the present invention for operating a forced-induction internal combustion engine, a variable compression is provided which is pilot-controlled in such a way that the effective compression is adapted to the efficiency upon combustion and to the component stress and component protection as a function of the aforesaid requirements, with elevated or higher compression in the naturally aspirated range and/or with lower or decreased compression in the forced-induction range.

The proposed variable-compression method allows a forced-induction internal combustion engine to be operated both in (entirely) naturally aspirated mode and in forced-induction mode, and in the transition range between these operating modes, with relatively high efficiency in terms of combustion, thus allowing the aforesaid highly contradictory requirements to be combined.

It is to be emphasized in this context that with the methods known in the existing art it is not possible to increase efficiency in the naturally aspirated range without also simultaneously increasing component stress in the forced-induction range.

The variable compression is preferably realized by camshaft shifting (phase shifting) using a camshaft phase adjuster, in particular an intake camshaft phase adjuster. Cam switching, however, for example using a variable valve train, can also be provided. The advantage of a camshaft phase adjuster as compared with a variable valve train is in particular the fact that no additional components are necessary in order to realize variable compression.

The aforesaid component protection can be improved by limiting the peak values of the cylinder pressure and by decreasing knock susceptibility.

The invention can be utilized in particular, with the advantages described herein, in a spark-ignited internal combustion engine (Otto cycle engine) of a motor vehicle.

Further advantages and embodiments of the invention are evident from the description and the appended drawings.

It is understood that the features recited above and those yet to be explained below are usable not only in the respective combination indicated, but also in other combinations or in isolation, without departing from the scope of the present invention.

BRIEF DESCRIPTION OF THE DRAWING

The FIGURE shows a flowchart of an example method according to the present invention.

DETAILED DESCRIPTION OF THE INVENTION

The FIGURE depicts an exemplifying embodiment of the method according to the present invention using the example of an Otto cycle engine with forced induction by way of a turbocharger. It is understood that the principles described herein are also applicable to a forced-induction diesel engine.

After startup 100 of the routine shown, firstly current operating conditions of the motor or internal combustion engine, furnished e.g. by an engine control unit 102 or a corresponding sensor suite (not shown), are retrieved or sensed 105, specifically e.g. the engine speed, engine load, boost pressure, ambient pressure, ambient temperature, octane number of the fuel, or the like.

Based on the sensed operating conditions, the knock susceptibility of the current fuel/air mixture is estimated or calculated 110 by way of a model calculation based on a first model 107. First model 107 in particular takes into account current values for the load on and rotation speed of the engine, and for the ambient temperature and thus the air temperature of the air aspirated by the engine. In the present exemplifying embodiment, the knock susceptibility of the internal combustion engine is indicated by way of a knock index (e.g. octane number).

From this knock susceptibility value, a maximum compression ratio at which it is predicted that knocking will not yet occur is calculated 115. Additionally in step 120, a maximum permissible peak value for the cylinder pressure in the context of combustion is derived on the basis of data 117, in the present case stored in the aforesaid engine control unit, for component stress limits and for the operating conditions sensed in step 105, once again by way of a model calculation based on a second model 118.

In the present exemplifying embodiment, second model 118 corresponds to an inverted torque limiting model in which the maximum permissible peak pressure is calculated from the maximum torque in accordance with an existing torque limit that is derived in turn from the ambient conditions and from the current operating point of the internal combustion engine.

Concurrently with or in addition to the aforesaid steps 110, 115, a compression ratio optimized in terms of fuel consumption is calculated 125, once again on the basis of a model calculation with reference to a third model 123. In the present exemplifying embodiment, third model 123 is based on a compression ratio that is defined by the engine manufacturer and is optimal in the context of the design of a specific engine. Taking into account the maximum compression ratio calculated in step 115 and the peak value for maximum cylinder pressure calculated in step 120, in step 130 the maximum compression ratio usable at the current operating point (called the "compression limit") is derived. Based on this maximum value for the compression ratio, in the present exemplifying embodiment a target value for the compression ratio is further derived 135, which value is taken into account as a requested value when controlling the intake valves.

In this exemplifying embodiment, the implementation of the requested compression ratio which is optimal at the current operating point, using the adjusters available in the internal combustion engine, is ascertained using an adjuster coordinator 140. In the context of implementation, an adjuster target value for the aforesaid intake camshaft phase shifting system is derived 145 from the aforesaid target value of the compression ratio, specifically a target angle for the closing time of the relevant intake valve.

With the method described, an optimum compression ratio for combustion with the lowest possible fuel consumption is always provided, component stresses in particular at the same time being limited.

The method described can be realized either in the form of a control program in an existing control unit for controlling an internal combustion engine or in the form of a corresponding control unit.

What is claimed is:

1. A method for operating a forced-induction internal combustion engine with variable compression, comprising:
   providing a pilot-control of the variable compression in order to establish a selected compression as a function of combustion efficiency and mechanical stress on components of the internal combustion engine, wherein at least one of (i) elevated compression is established in a naturally aspirated range and (ii) decreased compression is established in the forced-induction range.

2. The method as recited in claim 1, wherein the variable compression is generated by phase shifting of a camshaft of the internal combustion engine.

3. The method as recited in claim 1, wherein the variable compression is generated by cam switching.

4. The method as recited in claim 3, wherein the cam switching is accomplished by a variable valve train.

5. The method as recited in claim 3, wherein a maximum permissible limit of cylinder pressure value is provided in order to protect components of the internal combustion engine from mechanical overload.

6. The method as recited in claim 5, wherein the knock susceptibility of the internal combustion engine is decreased in order to protect components of the internal combustion engine from mechanical overload.

7. The method as recited in claim 6, wherein the knock susceptibility is identified on the basis of sensed operating conditions of the internal combustion engine by a model calculation based on a first model, and wherein a maximum compression ratio is calculated from the identified knock susceptibility.

8. The method as recited in claim 5, wherein the maximum permissible limit of cylinder pressure value is identified on the basis of (i) sensed operating conditions of the internal combustion engine, (ii) existing component load stress limits, and (iii) a second model calculation based on a torque limiting model in which the maximum permissible value of the cylinder pressure is calculated from the maximum permissible torque of the internal combustion engine.

9. The method as recited in claim 8, wherein a compression ratio optimized in terms of fuel consumption is calculated on the basis of a model calculation based on a third model.

10. The method as recited in claim 9, wherein a maximum usable compression ratio at an instantaneous operating point of the internal combustion engine is calculated taking into account the calculated maximum compression ratio and the calculated maximum cylinder pressure, and wherein a target compression ratio value is calculated on the basis of the maximum usable compression ratio, and wherein the target compression ration value is taken into account when controlling intake valves of the internal combustion engine.

11. A non-transitory, computer-readable data storage medium storing a computer program having program codes which, when executed on a computer, perform a method for operating a forced-induction internal combustion engine with variable compression, the method comprising:
   providing a pilot-control of the variable compression in order to establish a selected compression as a function of combustion efficiency and mechanical stress on components of the internal combustion engine, wherein at least one of (i) elevated compression is established in a naturally aspirated range and (ii) decreased compression is established in the forced-induction range.

\* \* \* \* \*